(12) United States Patent
Jin et al.

(10) Patent No.: US 9,041,382 B2
(45) Date of Patent: May 26, 2015

(54) POWER-SUPPLY CIRCUIT FOR DC APPLIANCE

(75) Inventors: Hyun Cheol Jin, Hwaseong-si (KR); Han Sol Seo, Seoul (KR); Hyun Soo Park, Seoul (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 61 days.

(21) Appl. No.: 13/359,259

(22) Filed: Jan. 26, 2012

(65) Prior Publication Data

US 2012/0201051 A1    Aug. 9, 2012

(30) Foreign Application Priority Data

Feb. 9, 2011    (KR) .................. 10-2011-0011413

(51) Int. Cl.
G05F 1/613    (2006.01)
H02M 7/06    (2006.01)

(52) U.S. Cl.
CPC ............ H02M 7/062 (2013.01); *Y10S 323/908* (2013.01)

(58) Field of Classification Search
USPC ......... 363/44, 7, 48, 52, 81, 114, 125, 45, 46, 363/49, 57, 126, 84; 323/367, 229, 908
See application file for complete search history.

(56) References Cited

U.S. PATENT DOCUMENTS

| | | | | |
|---|---|---|---|---|
| 4,679,133 A | * | 7/1987 | Moscovici | 363/46 |
| 5,874,788 A | * | 2/1999 | McCartney | 307/66 |
| 6,239,992 B1 | * | 5/2001 | Hamaoka et al. | 363/46 |
| 2010/0308584 A1 | * | 12/2010 | Coates et al. | 290/44 |

FOREIGN PATENT DOCUMENTS

KR    1998-054017    10/1998

* cited by examiner

*Primary Examiner* — Gary L Laxton
*Assistant Examiner* — Trinh Dang
(74) *Attorney, Agent, or Firm* — Staas & Halsey LLP

(57) ABSTRACT

A power-supply circuit for a DC appliance includes an input unit including a first terminal and a second terminal so as to receive a DC current, an output unit including a third terminal to output the DC current entered by the input unit and a fourth terminal, a connection unit including a first conductive line and a second conductive line so as to interconnect the input unit and the output unit, a rectifier unit including first to fourth diodes coupled as a bridge diode format so as to rectify the input DC current in a predetermined direction, an inductor unit that is connected in series to the rectifier unit in such a manner that the input DC current is gradually increased from an abrupt change time point of the DC current, and a condenser unit that is connected in series to the inductor unit.

34 Claims, 17 Drawing Sheets

POWER-SUPPLY CIRCUIT FOR DC APPLIANCE

CROSS-REFERENCE TO RELATED APPLICATIONS

This application claims the priority benefit of Korean Patent Application No. 2011-0011413, filed on Feb. 9, 2011 in the Korean Intellectual Property Office, the disclosure of which is incorporated herein by reference.

BACKGROUND

1. Field

Example embodiments of the following description relate to a power-supply circuit for a DC appliance for safely outputting a DC current when an input DC current is abruptly changed.

2. Description of the Related Art

Conventionally, power has been supplied to household appliances or electric devices of a general home by an AC power distribution system providing commercial power. The AC power distribution system supplies power to electric devices using a plug, a socket, a switch, and the like. In addition, the electric device having received AC power converts AC power into DC power using a rectifier embedded therein. Although the AC power distribution system does not include a device for preventing arc from being generated in plug separation, safety or stability is not guaranteed.

However, in the future, it is expected that the demand of a general home that desires to use DC power using a solar battery, a fuel cell, and the like. will rapidly increase. DC power can reduce energy loss generated when a conventional AC power distribution system converts AC power into DC power, and can be easily stored, so that it can effectively cope with emergencies. In the case of using AC power, provided that a unique power factor of a device is bad or poor, although the device has the same power consumption, a generation end has to generate as much power as reactive power, resulting in energy inefficiency.

In fact, the number of household appliances, each including an inverter, is rapidly increasing, and most digital devices use DC current.

Therefore, a plug suitable for DC power distribution is needed. The conventional DC power plug is identical in structure to the AC power plug, so that a rush current occurs in power distribution or an arc occurs in power distribution blocking, resulting in safety issues.

The DC current has a positive polarity and a negative polarity, differently from the AC current. If a reverse voltage is applied to an electric device, the electric device is not operated and constituent components of the power-supply unit are broken. Therefore, a plug for DC current distribution needs to be designed to make a distinction between the positive and negative polarities, and a conventional DC plug may include different sizes of an anode terminal and a cathode terminal, as shown in FIG. 1A, in such a manner that the anode terminal and the cathode terminal are differently inserted into a socket, or may include anode and cathode terminals arranged in the form of L-shape, as shown in FIG. 1B.

In conclusion, the user may have difficulty in using a DC plug capable of being inserted in one way, as compared to using the AC plug, capable of being inserted in two ways.

SUMMARY

Therefore, it is an aspect of the present disclosure to provide a power-supply circuit for a DC appliance, which includes a bridge-diode shaped rectifier unit to rectify a current flowing in the power-supply circuit of the DC appliance in a predetermined direction, an inductor unit serially connected to the rectifier unit so as to prevent the abrupt change of the current, a condenser unit for charging a voltage affected by the current passing through the inductor unit, and discharging the charged voltage from a specific time point at which an input DC current is abruptly changed, such that a DC current can be safely outputted even when the input DC current is abruptly changed.

In accordance with one aspect of the present disclosure, a power-supply circuit for a DC appliance includes an input unit, including a first terminal and a second terminal located below the first terminal so as to receive a DC current; an output unit including a third terminal to output the DC current entered by the input unit and a fourth terminal located below the third terminal; a connection unit including a first conductive line and a second conductive line located below the first conductive line so as to interconnect the input unit and the output unit; a rectifier unit including first to fourth diodes coupled as a bridge diode format connected between the first terminal and the second terminal so as to rectify the input DC current in a predetermined direction; an inductor unit that is connected in series to the rectifier unit in such a manner that the input DC current is gradually increased from an abrupt change time point of the DC current; and a condenser unit that is connected in series to the inductor unit, is charged with voltage in response to a current passing through the inductor unit, and discharges the charged voltage to the output unit from a specific time point at which the DC current is abruptly changed.

The specific time at which the DC current is abruptly changed may be a time point at which a DC current is input through the input unit or a time point at which application of the DC input is interrupted.

The rectifier unit may flow back a residual current present in the DC-appliance power-supply circuit to the output unit when the DC current input is stopped, thereby preventing an arc phenomenon generated when the current is leaked to outside of the DC-appliance power-supply circuit.

A contact point between an anode terminal of the first diode and a cathode terminal of the third diode may be connected to the first terminal, and a contact point between the second diode and the fourth diode may be connected to the second terminal.

The rectifier unit may further include a fifth diode connected between a contact point of a cathode terminal of the first diode and a cathode terminal of the second diode and another contact point of an anode terminal of the third diode and an anode terminal of the fourth diode.

A cathode terminal of the fifth diode may be connected to the contact point of the cathode terminals of the first and second diodes, and an anode terminal of the fifth diode may be connected to the contact point of the anode terminals of the third and fourth diodes.

The rectifier unit may output a constant-polarity DC current through the output unit irrespective of polarity of the input DC current.

When negative power is inputted to the first terminal and positive power is inputted to the second terminal in the rectifier unit, the first and fourth diodes of the rectifier unit may be turned off and the second and third diodes of the rectifier unit may be turned on.

When positive power is inputted to the first terminal and negative power is inputted to the second terminal in the rectifier unit, the first and fourth diodes of the rectifier unit may be turned on and the second and third diodes of the rectifier unit may be turned off.

The condenser unit may reduce a difference between a voltage of the first and second terminals of the input unit and another voltage of the third and fourth terminals of the output unit when the DC current input is stopped, thereby preventing an arc phenomenon.

The condenser unit may be connected between the third terminal and fourth terminals in such a manner that the charged voltage is discharged to the output unit when the DC current input is stopped.

Capacitance of the condenser unit may be adjusted in such a manner that the voltage difference between the input unit and the output unit is maintained within a predetermined range for a predetermined time beginning from a specific time at which the DC current input is stopped.

The inductor unit may prevent a current of the DC-appliance power-supply circuit from being rapidly increased when the DC current input starts operation, thereby preventing flow of a rush current.

Inductance of the inductor unit may be adjusted in such a manner that a current of the DC-appliance power-supply circuit is increased with an appropriate speed.

The DC-appliance power-supply circuit may be installed in a plug or an electric device receiving the DC current.

In accordance with another aspect of the present disclosure, a power-supply circuit for a DC appliance includes an input unit including a first terminal and a second terminal located below the first terminal so as to receive a DC current; an output unit including a third terminal to output the DC current entered by the input unit and a fourth terminal located below the third terminal; a connection unit including a first conductive line and a second conductive line located below the first conductive line so as to interconnect the input unit and the output unit; a rectifier unit including first to fourth diodes coupled as a bridge diode format so as to rectify the input DC current in a predetermined direction; a condenser unit that is connected in parallel to the rectifier unit so as to be charged with a voltage in response to the rectified current, and discharges the charged voltage to the output unit from a specific time at which the DC current is abruptly changed; and an inductor unit that is connected in series to the rectifier unit and the condenser unit interconnected in parallel in such a manner that the DC current is gradually increased from an abrupt change time point of the DC current.

The abrupt change time point of the DC current may be a time point at which a DC current is inputted through the input unit or a time point at which application of the DC input is interrupted.

The rectifier unit may flow back a residual current present in the DC-appliance power-supply circuit to the output unit when the DC current input is stopped, thereby preventing an arc phenomenon generated when the current is leaked to outside of the DC-appliance power-supply circuit.

In the rectifier unit, a contact point between a cathode terminal of the first diode and a cathode terminal of the second diode may be located at the first conductive line, and a contact point between an anode terminal of the third diode and an anode terminal of the fourth diode may be located at the second conductive line.

The rectifier unit may further include a fifth diode connected between a contact point of a cathode terminal of the first diode and a cathode terminal of the second diode and another contact point of an anode terminal of the third diode and an anode terminal of the fourth diode.

A cathode terminal of the fifth diode may be connected to the contact point of the cathode terminals of the first and second diodes, and an anode terminal of the fifth diode may be connected to the contact point of the anode terminals of the third and fourth diodes.

The rectifier unit may output a constant-polarity DC current through the output unit irrespective of polarity of the input DC current.

When negative power is inputted to the first terminal and positive power is inputted to the second terminal in the rectifier unit, the first and fourth diodes of the rectifier unit may be turned off and the second and third diodes of the rectifier unit may be turned on.

When positive power is inputted to the first terminal and negative power is inputted to the second terminal in the rectifier unit, the first and fourth diodes of the rectifier unit may be turned on and the second and third diodes of the rectifier unit may be turned off.

The condenser unit may reduce a difference between a voltage of the first and second terminals of the input unit and another voltage of the third and fourth terminals of the output unit when the DC current input is stopped, thereby preventing an arc phenomenon.

Capacitance of the condenser unit may be adjusted in such a manner that the voltage difference between the input unit and the output unit is maintained within a predetermined range for a predetermined time beginning from a specific time at which the DC current input is stopped.

The inductor unit may prevent a current of the DC-appliance power-supply circuit from being rapidly increased when the DC current input starts operation, thereby preventing flow of a rush current.

Inductance of the inductor unit may be adjusted in such a manner that a current of the DC-appliance power-supply circuit is increased with an appropriate speed.

One terminal of the inductor unit may be connected to the first terminal and the other terminal of the inductor unit may be connected to the rectifier unit and the condenser unit interconnected in parallel.

One terminal of the inductor unit may be connected to the first terminal and the other terminal of the inductor unit may be connected to a contact point of an anode terminal of the first diode and a cathode terminal of the third diode.

In the rectifier unit, a contact point of an anode terminal of the second diode and a cathode terminal of the fourth diode may be connected to the second terminal.

The condenser unit may be connected between the third terminal and fourth terminals in such a manner that the charged voltage is discharged to the output unit when the DC current input is stopped.

One terminal of the inductor unit may be connected to the third terminal, and the other terminal of the inductor unit may be connected to the rectifier unit and the condenser unit interconnected in parallel.

The DC-appliance power-supply circuit may be installed in a plug or an electric device receiving the DC current.

Additional aspects of the disclosure will be set forth in part in the description which follows and, in part, will be obvious from the description, or may be learned by practice of the disclosure.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1A:
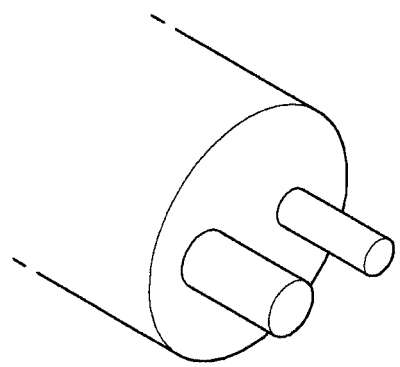
FIG. 1A shows a conventional DC plug.
Figure 1B:
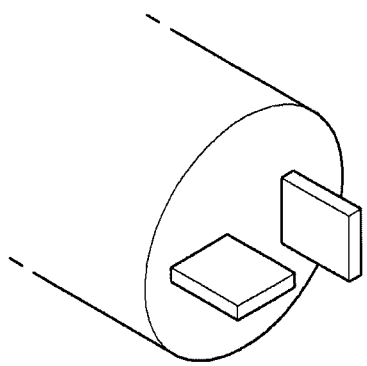
FIG. 1B shows a conventional DC plug.

Reference will now be made in detail to the embodiments of the present disclosure, examples of which are illustrated in the accompanying drawings, wherein like reference numerals refer to like elements throughout.

Figure 2:
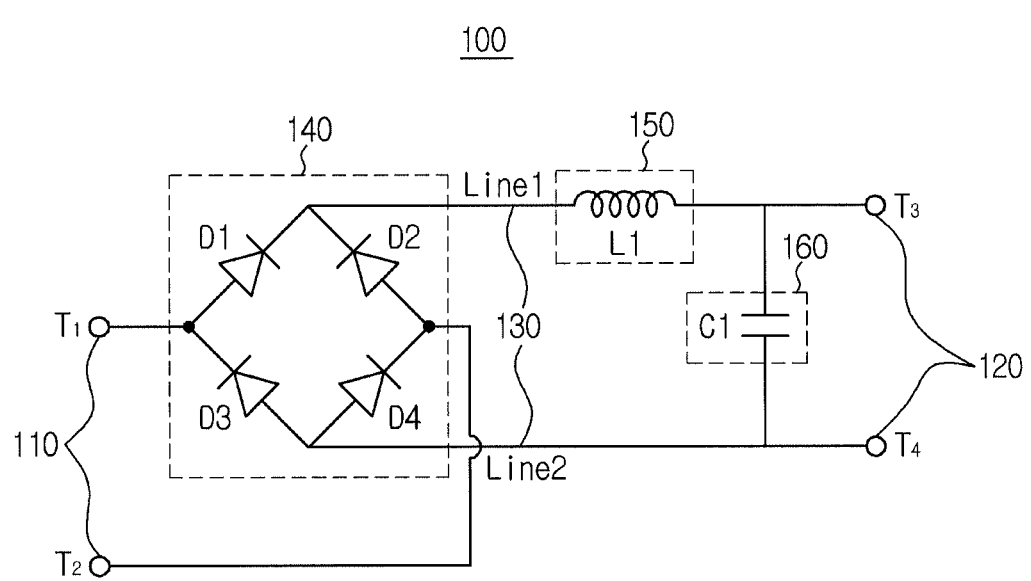
FIG. 2 is a circuit diagram illustrating a power-supply circuit for a DC appliance, according to an example embodiment.

FIG. 2 is a circuit diagram illustrating a power-supply circuit for a DC appliance, according to an embodiment of the present disclosure.

Referring to FIG. 2, the power-supply circuit 100 for a DC appliance includes an input unit 110 to receive a DC current, an output unit 120 to output the received DC current, a connection unit 130 to couple the input unit 110 to the output unit 120, a rectifier unit 140, an inductor unit 150, and a condenser unit 160.

The input unit 110 includes a first terminal T1 and a second terminal T2 located below the first terminal T1, so as to receive a DC current from an external part.

The input DC current is output through the output unit 120 that includes a third terminal T3 and a fourth terminal T4 located below the third terminal T3, used to operate the electric device.

The connection unit 130 includes a first conductive line (Line1) and a second conductive line (Line2) located below the first conductive line (Line1), so as to interconnect the input unit 110 and the output unit 120.

The connection unit 130 is coupled to the rectifier unit 140, the inductor unit 150, and the condenser unit 160, and allows the input DC current to be outputted to the output unit 120.

The rectifier unit 140 is configured in the form of a bridge diode including a first diode D1, a second diode D2, a third diode D3, and a fourth diode D4.

In addition, the rectifier unit 140 is located between the first terminal T1 and the second terminal T2 of the input unit 110.

In more detail, a contact point between an anode terminal of the first diode D1 and a cathode terminal of the third diode D3 is coupled to the first terminal T1 of the input unit 110, and a contact point between an anode terminal of the second diode D2 and a cathode terminal of the fourth diode D4 is coupled to a second terminal T2 of the input unit 110.

The rectifier unit 140 enables a DC current always having a constant polarity to be outputted to the output unit 120 irrespective of the polarity of DC power applied to the input unit 110.

Differently from the AC power, the DC power is classified into positive polarity DC power and negative polarity DC power. Therefore, the output unit 120 of the power-supply circuit 100 for the DC appliance (hereinafter referred to as a DC-appliance power-supply circuit 100) always has to output a constant-polarity DC current. The output unit 120 has to output a positive polarity DC current through the third terminal T3 and also has to output a negative polarity DC current through the fourth terminal T4.

For this operation, an embodiment of the present disclosure arranges a bridge-diode shaped rectifier unit 140 in the power-supply circuit 100 for the DC appliance so as to reduce inconvenience of the user who has to discriminate between input polarities, whereas the related art uses a physical method that enables a user to discriminate between input polarities in such a manner that constant-polarity DC power can be applied to the input unit.

The rectifier unit for always outputting a constant-polarity DC current irrespective of the input polarity will hereinafter be described with reference to FIGS. 3A and 3B.

Figure 3A:
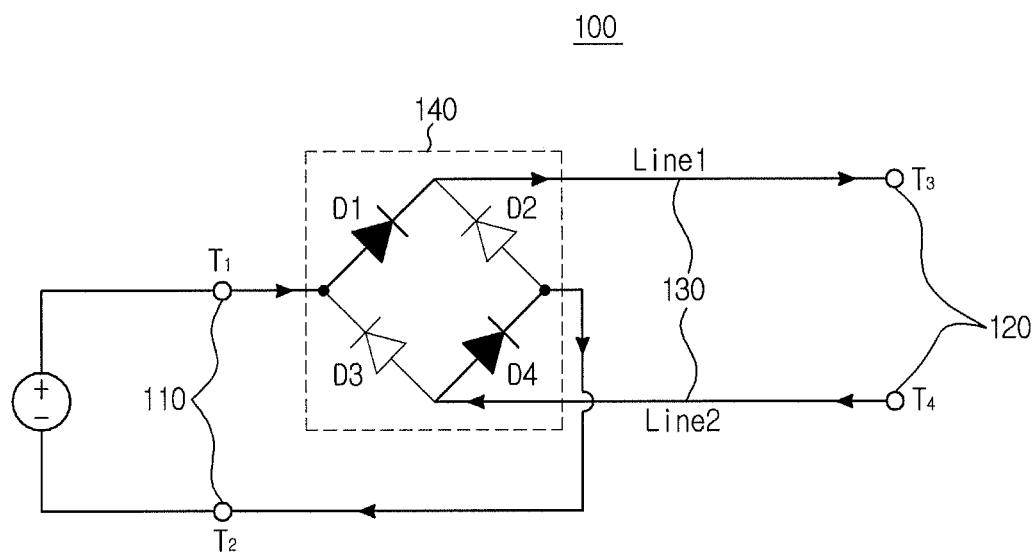
FIG. 3A shows operations of a rectifier unit when a straight-polarity DC current is applied to the input unit.

FIG. 3A shows the operations of the rectifier unit 140 during the application of a straight-polarity DC current in which a positive polarity signal is inputted to the first terminal T1 of the input unit 110 and a negative polarity signal is inputted to the second terminal T2.

Referring to FIG. 3A, if a straight-polarity DC current is applied to the power-supply circuit 100, a first diode D1 and a fourth diode D4 of the rectifier unit 140 are turned on, and a second diode D2 and a third diode D3 are turned off.

That is, the current flows in the rectifier unit 140 through the first and fourth diodes D1 and D4, and the current does not flow in the rectifier unit 140 through the second and third diodes D2 and D3.

Thus, the current of the power-supply circuit 100 for the DC appliance flows in a closed circuit composed of the first terminal T1, the first diode D1, the third terminal T3, the fourth terminal T4, the fourth diode D4, and the second terminal T2. Therefore, the positive DC current is outputted to the third terminal T3 of the output unit 120, and the negative DC current is outputted to the fourth terminal T4.

Figure 3B:
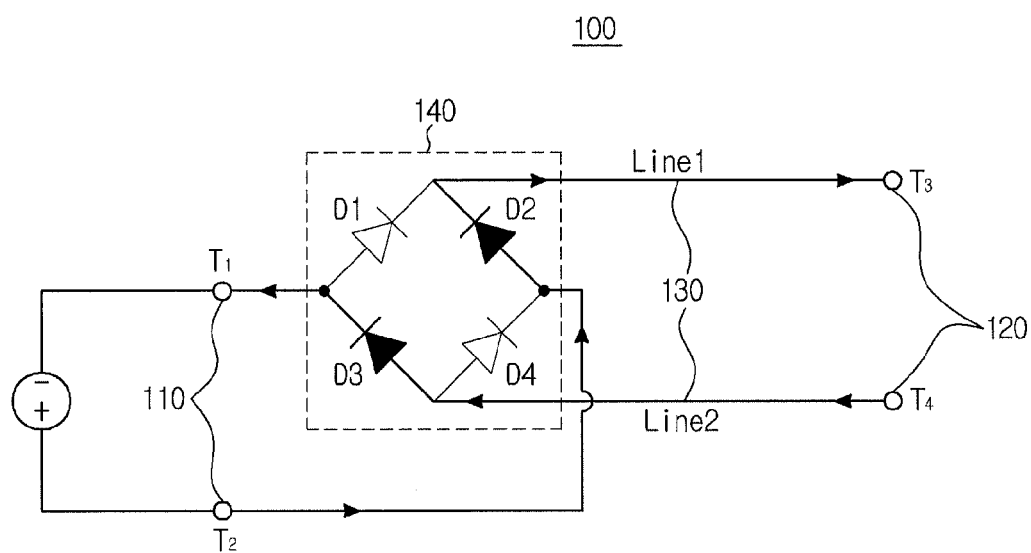
FIG. 3B shows operations of a rectifier unit when a reverse-polarity DC current is applied to the input unit.

FIG. 3B shows the operations of the rectifier unit 140 during the application of a reverse-polarity DC current in which a negative polarity signal is inputted to the first terminal T1 of the input unit 110 and a positive polarity signal is inputted to the second terminal T2.

Referring to FIG. 3B, if a reverse-polarity DC current is applied to the power-supply circuit 100, a first diode D1 and a fourth diode D4 of the rectifier unit 140 are turned off, and a second diode D2 and a third diode D3 are turned on.

That is, the current flows in the rectifier unit 140 through the second and third diodes D2 and D3, and the current does not flow in the rectifier unit 140 through the first and fourth diodes D1 and D4.

Thus, the current of the power-supply circuit 100 for the DC appliance flows in a closed circuit composed of the second terminal T2, the second diode D2, the third terminal T3, the fourth terminal T4, the third diode D3, and the first terminal T1. Therefore, the positive DC current is outputted to the third terminal T3 of the output unit 120, and the negative DC current is outputted to the fourth terminal T4.

Therefore, although the reverse-polarity DC current is inputted to the input unit 110, the third terminal T3 of the output unit 120 outputs the positive signal by the rectifier unit 140 and the fourth terminal T4 of the output unit 120 outputs the negative signal by the rectifier unit 140.

The rectifier unit 140 is configured in such a manner that the current of the power-supply circuit 100 for the DC appliance flows only in a predetermined direction. The rectifier unit 140 enables the current of the power-supply circuit 100 to flow from the input unit 110 to the output unit 120.

In this way, a residual current flowing in the power-supply circuit 100 when the application of DC current is interrupted is prevented from being leaked to the outside through the input unit 110. Detailed operations of the current leakage prevention effect caused by the rectifier unit 140 will be given below.

The inductor unit 150 may be comprised of an inductor serially connected to the rectifier unit 140. The inductor unit 150 is coupled to a contact point between the cathode terminal of the first diode D1 and the third terminal T3, and is located at a first line (Line1).

The inductor acting as a circuit element may be comprised of a coil that induces a voltage in proportion to current variation, so that it can perform current charging. The inductor prevents the current of the power-supply circuit 100 for the DC appliance from being abruptly changed.

Meanwhile, although the inductor unit 150 of the embodiment is comprised of only one inductor for convenience of description, the scope or spirit of the inductor unit 150 is not limited thereto. If necessary, in order to properly adjust inductance of the inductor unit 150, the inductor unit 150 may also be comprised of a plurality of inductors connected in series or in parallel to each other without departing from the scope or spirit of the present disclosure.

The condenser unit 160 is comprised of a condenser connected in series to the inductor unit 150. In more detail, one terminal of the condenser unit 160 is coupled to the inductor unit 150, and the other terminal thereof is coupled to a contact point between anode terminals of the third and fourth diodes D3 and D4 of the rectifier unit 140.

In addition, the condenser unit 160 is coupled between the third terminal T3 and the fourth terminal T4 of the output unit 120, such that it discharges the charged voltage to the output unit 120.

In more detail, during the application of DC current, the condenser unit 160 is charged with a voltage in response to a current passing through the inductor unit 150. Then, the voltage charged in the condenser unit 160 is discharged to the output unit 120 for a predetermined period of time from the beginning of interruption of DC current application.

Although the condenser unit 160 of the embodiment includes only one condenser for convenience of description, the scope or spirit of the condenser unit 160 is not limited thereto. If necessary, in order to properly adjust capacitance of the condenser unit 160, the condenser unit 160 may also be comprised of a plurality of condensers connected in series or in parallel without departing from the scope or spirit of the present disclosure.

The DC-appliance power-supply circuit 100 to safely output a DC current by preventing the problem that may be encountered upon an abrupt change point of the input DC current will hereinafter be described with reference to the drawings.

The abrupt change time point of the input DC current is any of a DC-current application time point (hereinafter referred to as a first time point) and a DC-current interruption time point (hereinafter referred to as a second time point).

The DC-appliance power-supply circuit 100 for preventing a rush current from being generated at the first time point, according to an embodiment of the present disclosure will hereinafter be described.

At the first time point, a rush current higher than a normal current flowing in the DC-appliance power-supply circuit may occur due to a condenser, etc. of load coupled to the DC-appliance power-supply circuit. Such rush current may apply impact to the electric device, resulting in a malfunction or a shortened lifetime of the electric device.

Although the conventional AC power distribution system limits such rush current using a relay, the DC power distribution system does not include a small-sized DC relay, and thus, a separate structure for preventing overcurrent is needed.

The DC-appliance power-supply circuit 100, according to an embodiment of the present disclosure includes the inductor unit 150 so as to prevent the above-mentioned problems.

In more detail, the amount of current flowing in the inductor 150 at the first time point is abruptly increased. The increased rush current means that magnetic flux induced to the inside of the inductor unit 150 is increased, and the inductor unit 150 restricts the increasing magnetic flux until the magnetic flux is saturated. That is, the inductor unit 150 restricts magnetic flux saturation, such that it prevents a current flowing in the inductor unit 150 from being rapidly increased.

Figure 4:
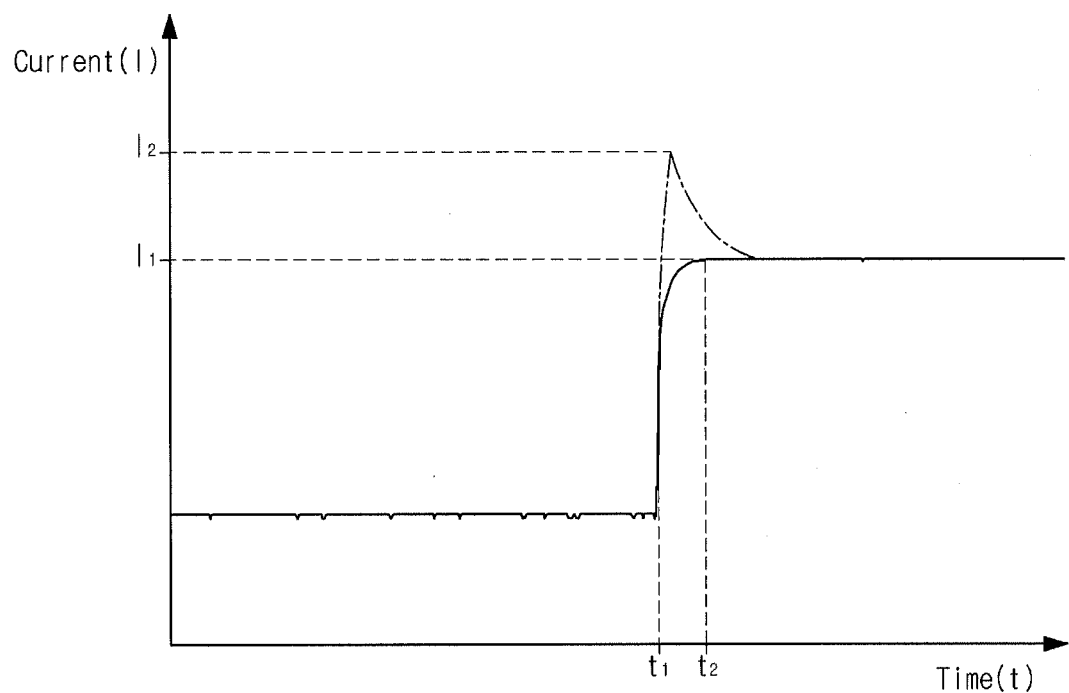
FIG. 4 shows a current changing with time when a DC current is applied to the power-supply circuit for the DC appliance.

FIG. 4 shows a current changing with time when a DC current is applied to the power-supply circuit for the DC appliance.

Referring to FIG. 4, a current flowing in the DC-appliance power-supply circuit is increased at the first time point ($t_1$). A current (denoted by a chain line) of the DC-appliance power-supply circuit having no inductor unit may be abruptly increased at the first time point ($t_1$), so that a rush current $I_2$ higher than a normal current $I_1$ flows and is converged into a normal current $I_1$ according to the lapse of time.

In contrast, a current (denoted by a solid line) of the DC-appliance power-supply circuit having the inductor unit is linearly increased for a predetermined time ($t_2-t_1$) from the beginning of the first time point ($t_1$). In more detail, a current of the DC-appliance power-supply circuit having the inductor unit is gradually increased to a normal current ($I_1$) for a predetermined time ($t_2-t_1$) from the beginning of the first time point ($t_1$), and is constantly maintained from the time ($t_2$) at which the current reaches the normal current ($I_1$).

In other words, the inductor unit linearly increases a current of the circuit until the current reaches a saturation current indicating a chargeable threshold value. If the current reaches the saturation current, the inductor unit serves as a conductive line.

As a result, the DC-appliance power-supply circuit, according to an embodiment of the present disclosure may prevent a rush current from being generated at the input moment of DC current.

The DC-appliance power-supply circuit 100 that prevents arc from being generated at the second time point (at which the DC current input is interrupted), according to an embodiment of the present disclosure, will hereinafter be described in detail.

At the second time point, arc may be generated by parasitic capacitance of an electric line and inductance of a load device. In more detail, because a current, which remains in the DC-appliance power-supply circuit without flowing to the electric device, is discharged to the outside, the arc phenomenon is generated.

In the conventional AC power distribution system, a voltage periodically reaches zero '0,' such that the arc phenomenon may be prevented from being generated, but a point at which a DC voltage is set to zero '0' is not present in the conventional AC power distribution system, and thus, arc is continuously generated. If the arc phenomenon is continuously generated, the electric device may be instantaneously damaged, durability of plug and conductive lines coupled to the DC-appliance power-supply circuit may be adversely affected, thereby causing a variety of electric shock accidents and a fire.

The DC-appliance power-supply circuit 100 includes a rectifier unit 140 and a condenser unit 160 so as to prevent the above-mentioned arc from being generated.

The rectifier unit 140 rectifies a residual current of the DC-appliance power-supply circuit 100 in a predetermined direction at the second time point, so that it can prevent current leakage from being generated.

In addition, the condenser unit 160 reduces a difference in voltage between the input unit 110 and the output unit 120 of the DC-appliance power-supply circuit 100 at the second time point, so that it can be used as a supplementary means for the arc prevention effect.

The flow of an internal current of the DC-appliance power-supply circuit 100 including the rectifier unit 140 and the condenser unit 160 and the arc-phenomenon prevention effect will hereinafter be described with reference to FIGS. 5A and 5B.

Figure 5A:
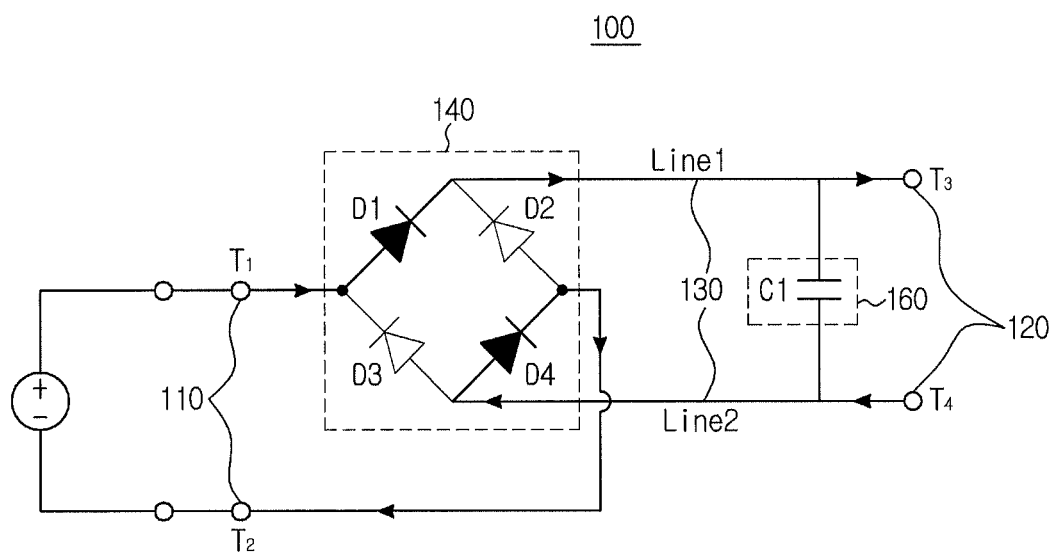
FIG. 5A shows the flow of current when a DC current is applied to the power-supply circuit for the DC appliance, including a rectifier unit and a condenser unit.

Referring to FIG. 5A, if a DC current is applied to the DC-appliance power-supply circuit 100, an electric current is applied to the first conductive line (Line1) and the second conductive line (Line2) of the connection unit 130. The current in response to the DC current is supplied to the electric device through the output unit 120, so that the voltage is electrically charged in the condenser unit 160.

Figure 5B:
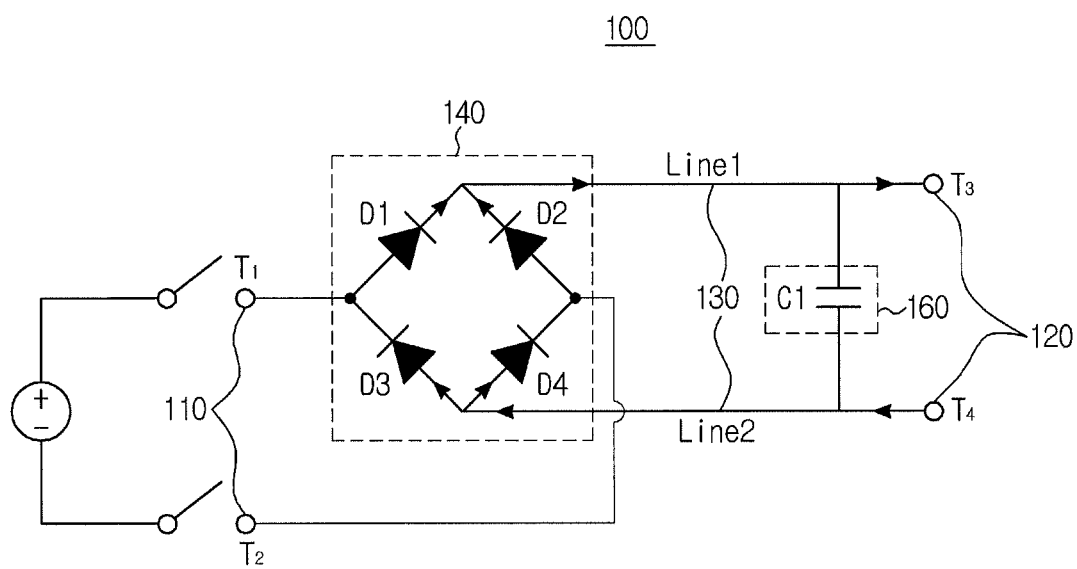
FIG. 5B shows the flow of current when applying the DC current to the power-supply circuit for the DC appliance, including the rectifier unit and the condenser unit is interrupted.

Referring to FIG. 5B, at the second time point (at which the application of DC current on the DC-appliance power-supply circuit is interrupted), the first terminal T1 and the second terminal T2 of the input unit 110 are opened.

The rectifier unit 140 enables the residual current to flow back to the output unit 120 in such a manner that the residual current of the DC-appliance power-supply circuit 100 is not leaked through the opened first and second terminals T1 and T2.

As a result, the arc phenomenon generated when the residual current of the DC-appliance power-supply circuit 100 is leaked outside through the output unit 120 is prevented.

In addition, the condenser unit 160 charged with voltage is discharged from the second time point.

In more detail, at the second time point, a voltage of the input unit 110 of the DC-appliance power-supply circuit 100 is identical to a voltage of the output unit 120 by a charge voltage charged in the condenser unit 160. By the condenser unit 160, a discharge current is leaked to the output unit 120 with lapse of time, so that a charging potential of the condenser unit 160 is reduced.

As a result, the arc phenomenon problem, caused by a difference in electric potential between the input unit and the output unit of the DC-appliance power-supply circuit, can be solved at the second time point.

Figure 6A:
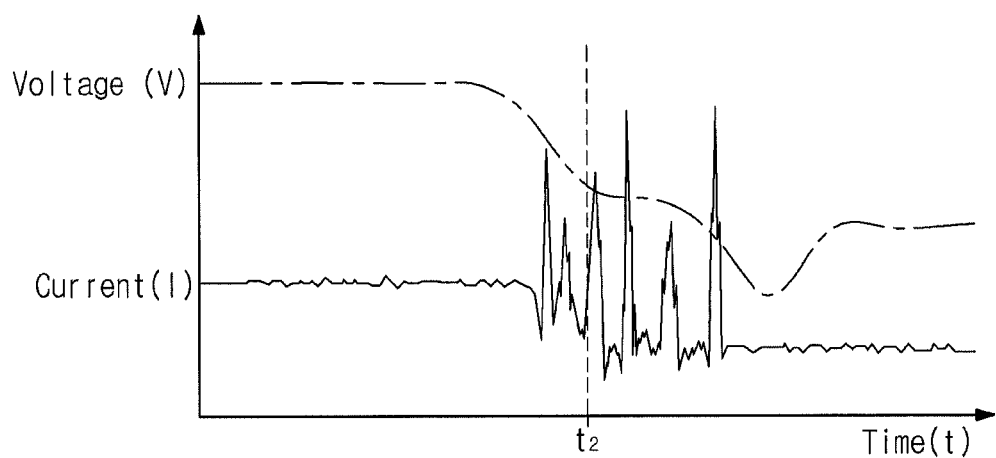
FIGS. 6A-6B show a current changing with time when the application of DC current on the power-supply circuit for the DC appliance is interrupted.
Figure 6B:
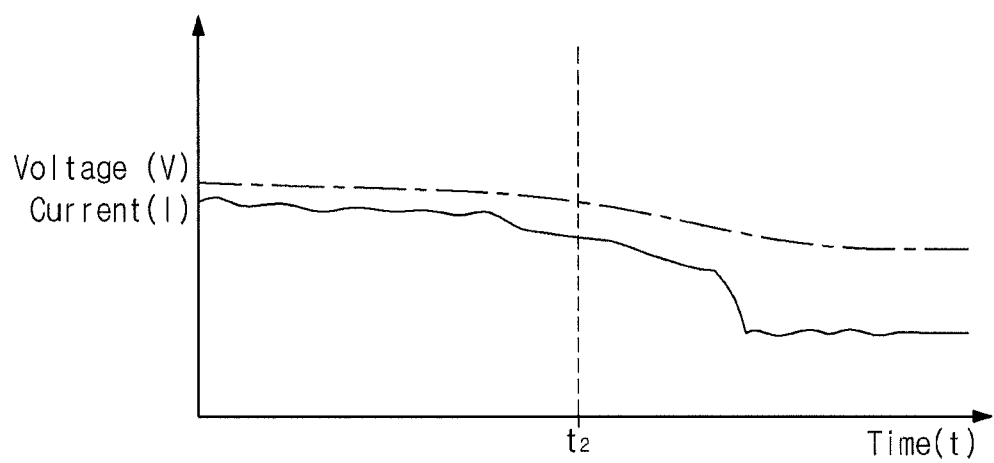

FIG. 6A shows a current variation with lapse of time when the DC-appliance power-supply circuit that does not include the rectifier unit and the condenser unit is located at the second time point ($t_2$), and FIG. 6B shows a current variation with lapse of time when the DC-appliance power-supply circuit including the rectifier unit and the condenser unit is located at the second time point ($t_2$).

Referring to FIG. 6A, as a voltage of the DC-appliance power-supply circuit is reduced from the second time point ($t_2$), including no rectifier unit and no condenser unit, a current is abruptly changed, resulting in the occurrence of arc.

In contrast, referring to FIG. 6B, a current of the DC-appliance power-supply circuit including the rectifier unit and the condenser unit is stably reduced, along with the power-supply circuit voltage that begins to reduce from the second time point ($t_2$), so that the arc problem can be solved.

The flow of current of the DC-appliance power-supply circuit, according to an embodiment of the present disclosure, will hereinafter be described with reference to FIGS. 7A and 7B.

Figure 7A:
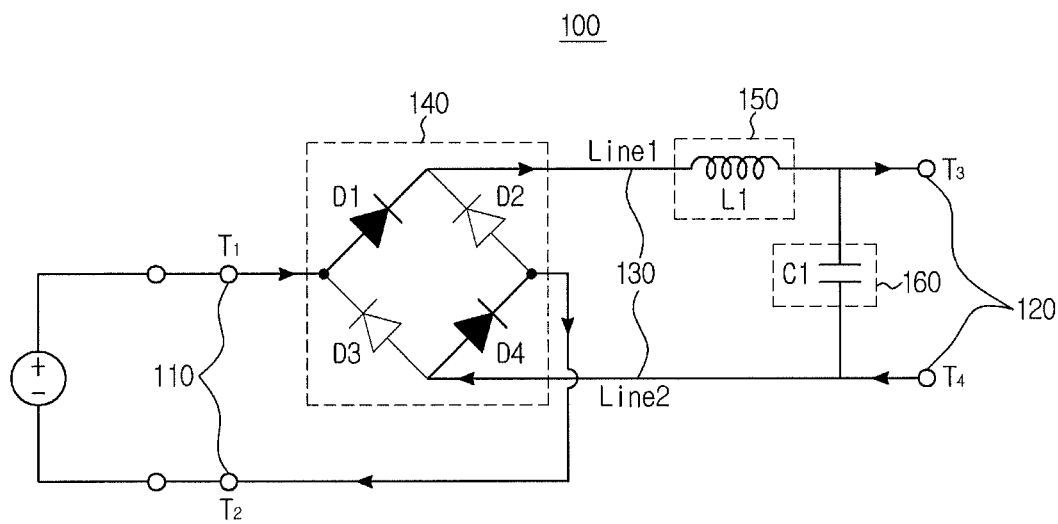
FIG. 7A shows the flow of current when a DC current is applied to the power-supply circuit for the DC appliance.

FIG. 7A shows the flow of current when a DC current is applied to the power-supply circuit for the DC appliance.

Referring to FIG. 7A, if a DC current is applied to the power-supply circuit 100, a current flows in a closed circuit composed of the first terminal T1, the first conductive line (Line1), the third terminal T3, the fourth terminal T4, and the second conductive line (Line2).

In this case, the inductor unit 150 is charged with a current such that the current of the DC-appliance power-supply circuit 100 is linearly increased, and the condenser unit 160, serially connected to the inductor unit 150, is charged with a voltage in response to the current passing through the inductor unit 150.

If a predetermined time has elapsed after the inductor unit 150 starts charging, a charging current of the inductor unit 150 is saturated so that the inductor 100 is used as a conductive line and constant current flows in the entirety of the DC-appliance power-supply circuit 100.

Meanwhile, it is preferable for inductance L1 of the inductor unit 150 to be properly adjusted in such a manner that a rush current can be prevented by gradually increasing the current in the DC-appliance power-supply circuit 100.

The inductance L1 is the ratio of back electromotive force (back-EMF) generated by electromagnetic induction in response to a variation of current flowing in the circuit, or the ratio of a time variance of a current flowing in a wire to a back electromotive force generated in the wire. If the inductance L1 is increased, a current charging speed of the inductor unit 150 is reduced. In other words, this means that a time consumed until a current passing through the inductor 150 reaches a saturation current is increased in proportion to the inductance L1.

Therefore, it is preferable for the DC-appliance power-supply circuit 100, according to an embodiment of the present disclosure to greatly adjust the inductance L1 of the inductor unit 150.

Figure 7B:
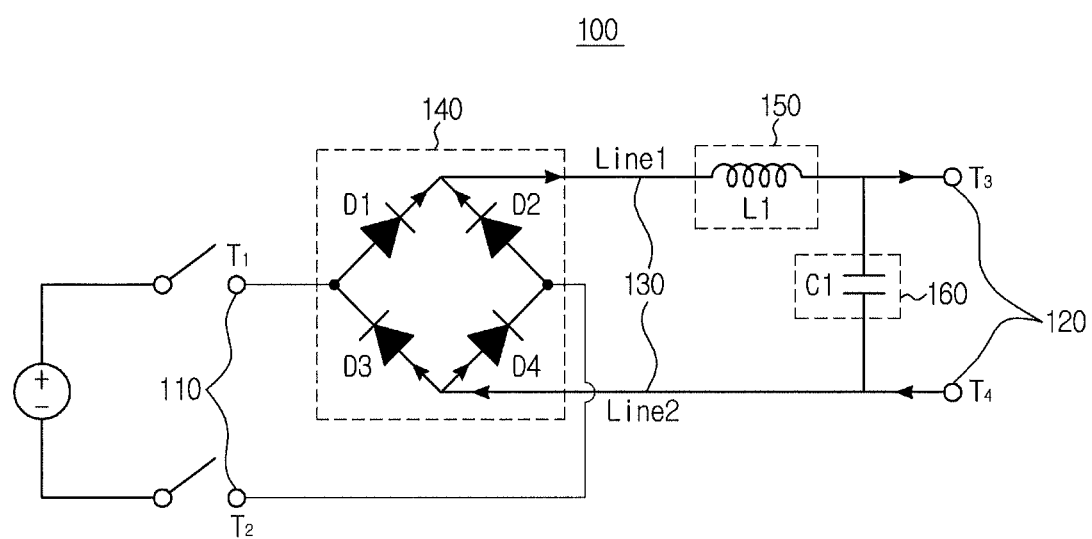
FIG. 7B shows the flow of current when applying the DC current to the power-supply circuit for the DC appliance is interrupted.

FIG. 7B shows the flow of current when applying the DC current to the power-supply circuit for the DC appliance is interrupted.

Referring to FIG. 7B, if the application of DC current on the DC-appliance power-supply circuit is interrupted, the rectifier unit 140 enables a residual current of the DC-appliance power-supply circuit 100 to flow back to the output unit 120. Therefore, an internal current of the DC-appliance power-supply circuit 100 is prevented from being leaked to the outside through the input unit 110.

On the other hand, the residual current of the DC-appliance power-supply circuit 100 includes not only a current that is not yet applied to the output unit 120 when the application of DC current is interrupted, but also a current charged in the inductor unit 150 due to a voltage variation (voltage drop) generated by the interruption of DC current application.

In more detail, if the DC current application is interrupted, the residual current flows from an anode terminal to a cathode terminal of each diode (D1, D2, D3, or D4). Thus, the residual current first flows in the DC-appliance power-supply circuit 100 and is then outputted to the output unit 120.

In addition, if the DC current application is interrupted, the condenser unit 160 discharges a charged voltage so that the voltage flows to the output unit 120. As a result, the charged voltage drop occurs in the condenser unit 160.

Capacitance C1 of the condenser unit 160 may be adjusted in such a manner that a voltage difference between the input unit 110 and the output unit 120 satisfies a predetermined range during a predetermined time from the beginning of the interruption of DC current application. That is, capacitance C1 of the condenser unit 160 may be adjusted in such a manner that a voltage difference between the input unit 110 and the output unit 120 does not exceed a predetermined level during a predetermined time starting from the interruption of DC current application.

In more detail, the higher the capacitance C1 of the condenser unit 160, the longer the discharge time, such that the input unit 110 and the output unit 120 may be maintained at the same voltage level during a long period of time. However, provided that the capacitance C1 is excessively adjusted, the tendency of voltage accumulation of the condenser unit 160 becomes stronger so that it may cause a rush current to occur in the DC current application. Accordingly, it is preferable for capacitance C1 to be properly adjusted.

The current of the DC-appliance power-supply circuit can be stably reduced through the above-mentioned adjusted condenser unit 160, such that the arc phenomenon can be effectively prevented.

Figure 8:
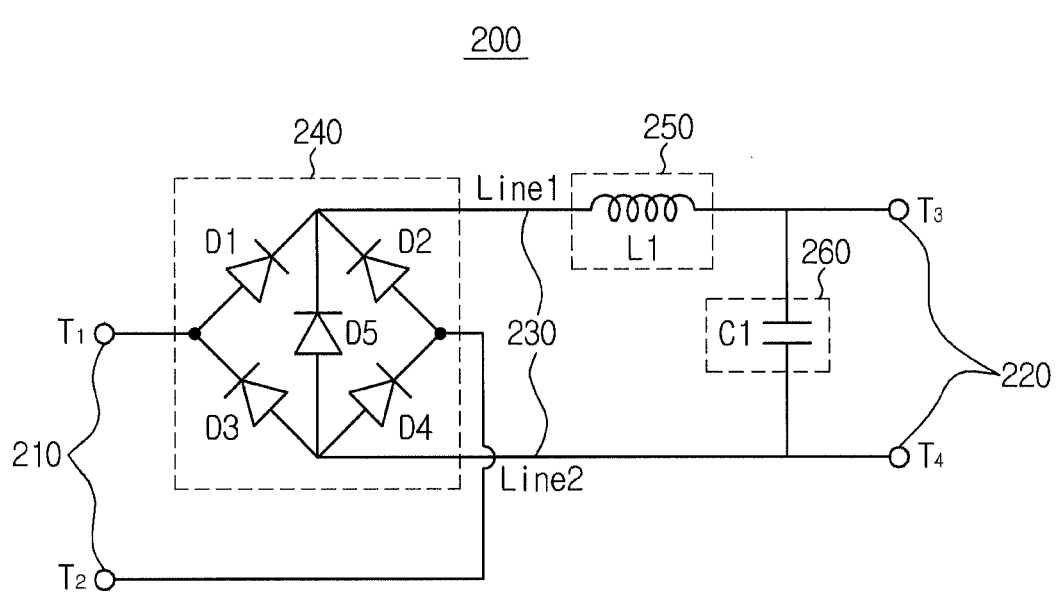
FIG. 8 is a circuit diagram illustrating the power-supply circuit for the DC appliance, according to another embodiment.

FIG. 8 is a circuit diagram illustrating the power-supply circuit for the DC appliance, according to another embodiment of the present disclosure.

Referring to FIG. 8, the DC-appliance power-supply circuit 200, according to another embodiment of the present disclosure includes an input unit 210 that includes a first terminal T1 and a second terminal T2 located below the first terminal T1; an output unit 220 to output an input DC current through a third terminal T3 and a fourth terminal T4 located below the third terminal T3; a connection unit 230 that includes a first conductive line (Line1) and a second conductive line (Line2) to interconnect the input unit 210 and the output unit 220; a rectifier unit 240 coupled as a bridge diode form between the first terminal T1 and the second terminal T2; an inductor unit 250 serially connected to the rectifier unit 240 so as to linearly increase the current of the DC-appliance power-supply circuit; and a condenser unit 260, serially connected to the inductor unit 250, such that it is charged with voltage in response to a current passing through the inductor unit 250 and discharges the charged voltage through the output unit 220.

The rectifier unit 240 is configured in the form of a bridge diode comprised of first to fourth diodes D1, D2, D3 and D4.

In more detail, a contact point between an anode terminal of the first diode D1 and a cathode terminal of the third terminal D3 is coupled to the first terminal T1 of the input unit 210, and a contact point between an anode terminal of the second diode D2 and a cathode terminal of the fourth diode D4 is coupled to the second terminal T2 of the input unit 210.

The rectifier unit 240 rectifies the current of the DC-appliance power-supply circuit 200 in the predetermined direction, and outputs a constant-polarity DC current to the output unit 220 irrespective of input DC power polarity. Detailed operations of the rectifier unit 240 are identical to those of the above-mentioned description, and as such a detailed description thereof will herein be omitted for convenience of description.

Specifically, the rectifier unit 240 further includes a fifth diode D5 located between a contact point of cathode terminals of the first diode D1 and the second diode D2 and a contact point of anode terminals of the third diode D3 and the fourth diode D4.

In more detail, a cathode terminal of the fifth diode D5 is connected to cathode terminals of the first and second diodes D1 and D2, and an anode terminal of the fifth diode D5 is connected to a contact point of anode terminals of the third and fourth diodes D3 and D4.

Therefore, when the application of DC current on the DC-appliance power-supply circuit 200 is interrupted, a residual current can quickly flow back to the output unit 220 through the fifth diode D5.

Besides, the effect of preventing the rush current of the DC-appliance power-supply circuit 200 simultaneously while preventing the arc problem is identical to that of the above-mentioned description, and as such a detailed description thereof will herein be omitted for convenience of description.

Figure 9:
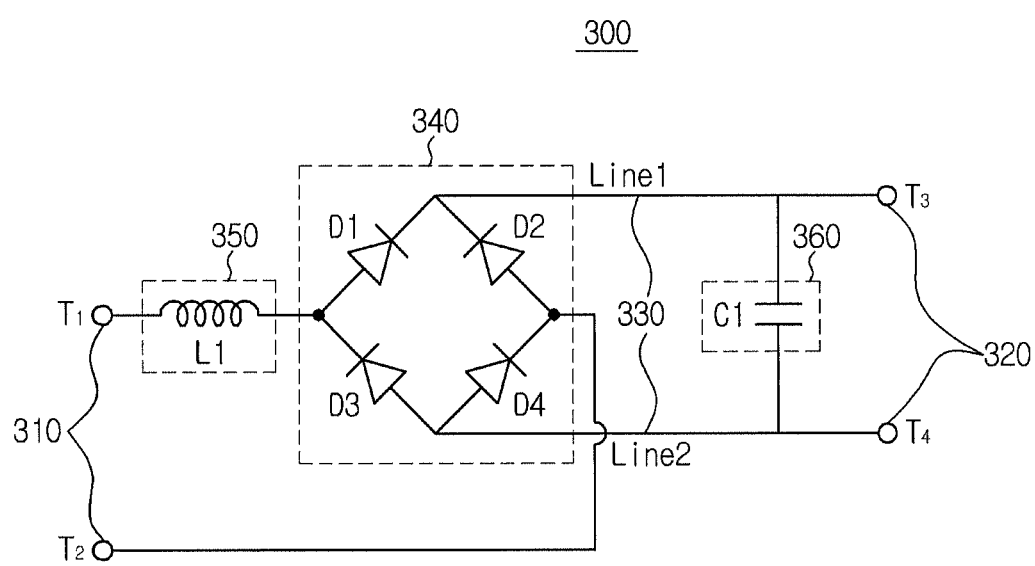
FIG. 9 is a circuit diagram illustrating the power-supply circuit for the DC appliance, according to another embodiment.

FIG. 9 is a circuit diagram illustrating the power-supply circuit for the DC appliance, according to another embodiment of the present disclosure.

Referring to FIG. 9, the DC-appliance power-supply circuit 300, according to another embodiment of the present disclosure includes an input unit 310 that includes a first terminal T1 and a second terminal T2 located below the first terminal T1; an output unit 320 to output an input DC current through a third terminal T3 and a fourth terminal T4 located below the third terminal T3; a connection unit 330 that includes a first conductive line (Line1) and a second conductive line (Line2) to interconnect the input unit 310 and the output unit 320; a rectifier unit 340 including first to fourth diodes D1 to D4 coupled in a bridge diode form so as to rectify the current of the DC-appliance power-supply circuit 300 in a predetermined direction; an inductor unit 350 to prevent the abrupt change of a current by linearly increasing the current of the DC-appliance power-supply circuit 300; and a condenser unit 360 connected to the inductor unit 350, such that it is charged with voltage in response to a current passing through the inductor unit 350 and discharges the charged voltage through the output unit 320.

Specifically, the DC-appliance power-supply circuit 300 includes the rectifier unit 340 and the condenser unit 360 connected in parallel to each other.

In more detail, a contact point between cathode terminals of the first and second diodes D1 and D2 of the rectifier unit 340 is located at the first conductive line (Line1), and a contact point between anode terminals of the third and fourth diodes D3 and D4 is located at the second conductive line (Line2).

The rectifier unit 340 configured in a bridge diode form is connected to the condenser unit 360 connected in parallel between the third and fourth terminals T3 and T4 of the output unit 320. That is, cathode terminals of the first and second diodes D1 and D2 are connected to the third terminal T3 of the output unit 320, and anode terminals of the third and fourth diodes D3 and D4 are connected to the fourth terminal T4 of the output unit 320.

In addition, the rectifier unit 340 and the condenser unit 360 connected in parallel to each other are serially connected to the inductor unit 350.

One terminal of the inductor unit 350 is connected to the first terminal T1, and the other terminal of the inductor unit 350 is connected to the rectifier unit 340 and the condenser unit 360 connected in parallel. That is, the inductor unit 350 is connected to the input side, and the rectifier 340 and the condenser unit 360 are connected to the output side.

In more detail, one terminal of the inductor unit 350 is connected to the first terminal T1, and the other terminal thereof is connected to a contact point between the anode terminal of the first diode D1 and the cathode terminal of the third diode D3. In addition, the second terminal T2 is connected to a contact point between the anode terminal of the second diode D2 and the cathode terminal of the fourth terminal D4.

On the other hand, although the rectifier unit 340 is comprised of four diodes interconnected in a bridge diode format, it may further include a fifth diode in such a manner that the residual current can quickly flow back to the output unit 320 when the application of DC current is interrupted. The connection and position of the fifth diode are identical to those of FIG. 8, and as such a detailed description thereof will hereinafter be omitted for convenience of description.

Besides, the effect of outputting a constant-polarity DC current to the output unit 320 irrespective of the DC current applied to the DC-appliance power-supply circuit 300 and the other effect of preventing the rush current of the DC-appliance plug 300 simultaneously while preventing the arc problem are identical to those of the above-mentioned description, and as such a detailed description thereof will herein be omitted for convenience of description.

Figure 10:
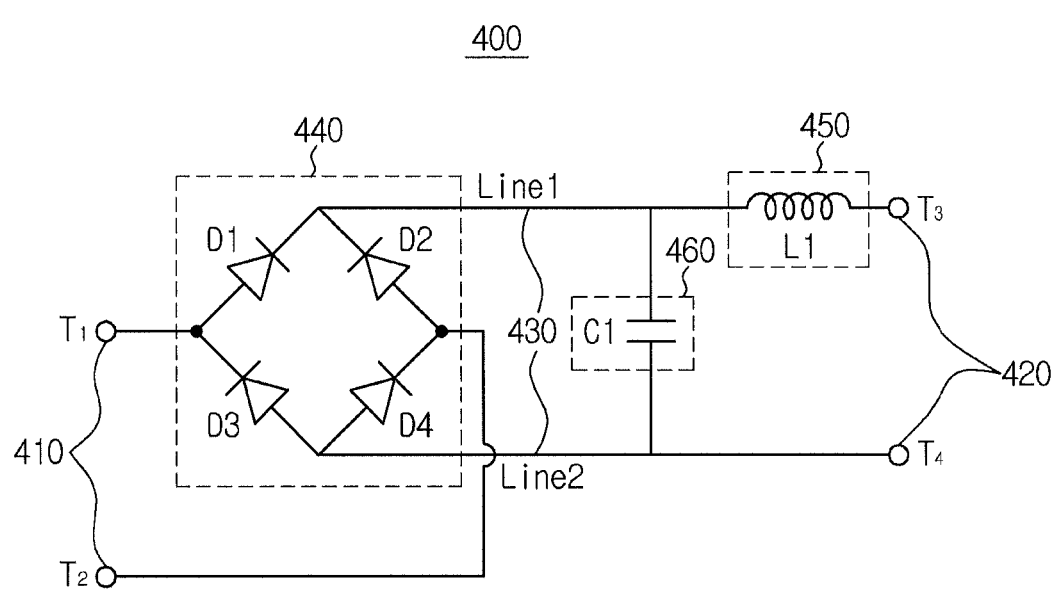
FIG. 10 is a circuit diagram illustrating the power-supply circuit for the DC appliance, according to another embodiment.

FIG. 10 is a circuit diagram illustrating the power-supply circuit for the DC appliance, according to another embodiment of the present disclosure;

Referring to FIG. 10, the DC-appliance power-supply circuit 400, according to another embodiment of the present disclosure includes an input unit 410 that includes a first terminal T1 and a second terminal T2 located below the first terminal T1; an output unit 420 to output an input DC current through a third terminal T3 and a fourth terminal T4 located below the third terminal T3; a connection unit 430 that includes a first conductive line (Line1) and a second conductive line (Line2) to interconnect the input unit 410 and the output unit 420; a rectifier unit 440 to rectify the current of the DC-appliance power-supply circuit 400 in a predetermined direction; an inductor unit 450 to prevent the abrupt change of a current by linearly increasing the current of the DC-appliance power-supply circuit 400; and a condenser unit 460 connected to the inductor unit 350, such that it is charged with voltage in response to a current passing through the inductor unit 450 and discharges the charged voltage through the output unit 420.

Specifically, the DC-appliance power-supply circuit 400 includes the rectifier unit 440 and the condenser unit 460 connected in parallel to each other.

In more detail, a contact point between cathode terminals of the first and second diodes D1 and D2 of the rectifier unit 440 is located at the first conductive line (Line1), and a contact point between anode terminals of the third and fourth diodes D3 and D4 is located at the second conductive line (Line2).

The rectifier unit 340 configured in a bridge diode form is connected in parallel to the condenser unit 360, and is also connected to the input unit 410. That is, the anode terminal of the first diode D1 and the cathode terminal of the third diode D3 are connected to the first terminal T1, and the anode terminal of the second diode D2 and the cathode terminal of the fourth diode D4 are connected to the second terminal T2.

In addition, the rectifier unit 440 and the condenser unit 460 connected in parallel to each other are serially connected to the inductor unit 450.

In more detail, one terminal of the inductor unit 450 is connected to the third terminal T3, and the other terminal thereof is connected to the rectifier unit 440 and the condenser unit 460 connected in parallel. That is, the inductor unit 450 is located at the first conductive line (Line1) and is connected to upper terminals of the rectifier unit 440 and the condenser unit 460 connected in parallel to each other.

On the other hand, although the rectifier unit 440 is comprised of four diodes (D1 to D4) interconnected in a bridge diode format, it may further include a fifth diode in such a manner that the residual current can quickly flow back to the output unit 420 when the application of DC current is interrupted. The connection and position of the fifth diode are identical to those of FIG. 8, and as such, a detailed description thereof will hereinafter be omitted for convenience of description.

Besides, the effect of outputting a constant-polarity DC current to the output unit 420 irrespective of the DC current applied to the DC-appliance power-supply circuit 400 and the other effect of preventing the rush current of the DC-appliance plug 400 simultaneously while preventing the arc problem are identical to those of the above-mentioned description, and as such a detailed description thereof will herein be omitted for convenience of description.

Figure 11:
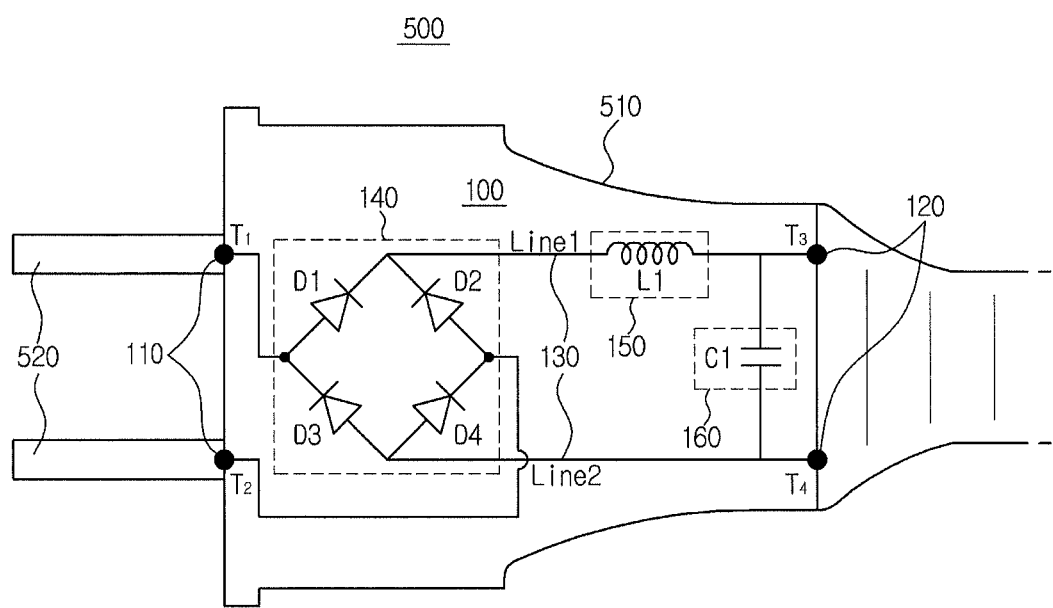
FIG. 11 shows the power-supply circuit mounted in the plug, according to an embodiment.

FIG. 11 shows the power-supply circuit mounted in the plug, according to an embodiment of the present disclosure.

Referring to FIG. 11, a plug 500 includes a plug housing 510, one pair of through-holes formed at one side of the plug housing 510, and one pair 520 of connectors installed at the through-holes and protruded outside.

The DC-appliance power-supply circuit 100, according to an embodiment of the present disclosure, is arranged in the plug 500.

In more detail, the positive input terminal 520 of the plug is connected to each of the first terminal T1 and the second terminal T2 of the input unit 110 of the DC-appliance power-supply circuit 100.

If the positive input terminal 520 of the plug 500 is inserted into the socket, the external DC current is applied to the positive input terminal 520 of the plug 500. The DC current is inputted to the DC-appliance power-supply circuit 100 through the input unit 110 of the DC-appliance power-supply circuit 100.

In addition, the third terminal T3 and the fourth terminal T4 of the output unit 120 of the DC-appliance power-supply circuit 100 are connected to the output side of the plug 500, and the output side of the plug 500 is connected to the electric device such that the DC current can be applied to the electric device.

In the case of the plug 500 shown in FIG. 11, the format and arrangement of the positive input terminal 520 are identical, differently from the conventional DC plug in which the positive and negative(−) terminals are discriminated from each other. The DC-appliance power-supply circuit 100, according to an embodiment of the present disclosure is designed to output a constant-polarity DC current irrespective of the polarity of input DC current.

Meanwhile, the DC-appliance power-supply circuit 100 of the plug 500 is disclosed only for illustrative purposes, and it should be noted that a variety of DC-appliance power-supply circuits may also be arranged in the plug without departing from the scope or spirit of the present disclosure.

Figure 12:
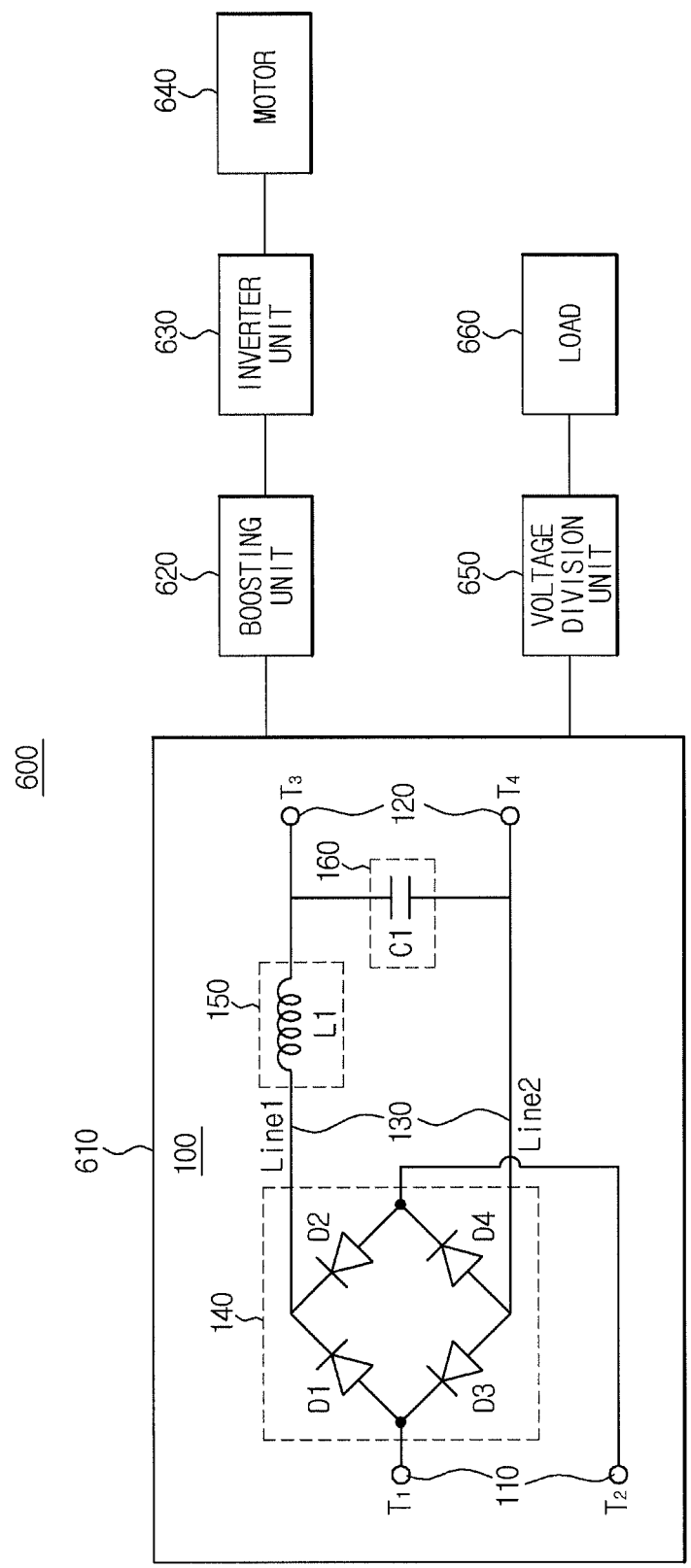
FIG. 12 shows the power-supply circuit mounted in the electric device, according to an embodiment.

FIG. 12 shows the power-supply circuit mounted in the electric device, according to an embodiment of the present disclosure.

Referring to FIG. 12, the DC-appliance power-supply circuit 100 may be arranged in the power-supply unit 610 of the electric device 600.

The power-supply unit 610, including the DC-appliance power-supply unit 100 may be connected to a boosting unit 620 and an inverter unit 630. The boosting unit 620 includes a switching circuit for switching a DC voltage and outputs the boosted voltage through the switching circuit. The inverter unit 630 receives the boosted DC voltage from the boosting unit 620, switches the received DC voltage in response to a PWM control signal so as to output AC power, and applies the AC power to the motor 640 acting as an electric load.

In addition, the power-supply unit 610 may be connected to the voltage division unit 650, which includes resistors for DC current division and outputs the properly divided voltages to a variety of loads 660 of the electric device according to the above-mentioned resistors.

On the other hand, the DC-appliance power-supply circuit 100, according to the present disclosure is disclosed only for illustrative purposes, and the above-mentioned variety of DC-appliance power-supply circuits may also be arranged in the power-supply unit of the electric device.

As is apparent from the above description, the above-mentioned power-supply circuit for the DC appliance, according to an embodiment of the present disclosure includes a rectifier unit and a condenser unit so that it enables a residual current of the power-supply circuit for the DC appliance to flow back to the output unit when the application of DC current is interrupted. As a result, the power-supply circuit for the DC appliance prevents a current from being leaked to outside and reduces a difference in voltage between the input unit and the output unit, resulting in the prevention of arc that may be generated at a specific time at which the application of DC current is interrupted.

The power-supply circuit further includes an inductor unit that linearly increases a current during a predetermined time starting from the application time point of DC current, resulting in the prevention of a rush current.

Therefore, durability of the electric device, plug, and conductive lines can be improved through a simple circuit configuration, and a user can safely use DC current.

In addition, the rectifier unit contained in the power-supply circuit is implemented as a bridge diode, such that a DC current always having a constant polarity can be outputted irrespective of the polarity of input DC current. As a result, although input polarities are not distinguished from each other, according to the physical process in which different shapes of anode and cathode terminals are used, the result is greater convenience of use.

Although a few embodiments of the present disclosure have been shown and described, it would be appreciated by those skilled in the art that changes may be made in these embodiments without departing from the principles and spirit of the disclosure, the scope of which is defined in the claims and their equivalents.

What is claimed is:

1. A power-supply circuit for a DC appliance, comprising:
an input unit including a first terminal and a second terminal so as to receive an input DC current from a DC power source;
an output unit including a third terminal and a fourth terminal to output the DC current entered by the input unit to a load;
a connection unit, including a first conductive line and a second conductive line so as to interconnect the input unit and the output unit;
a rectifier unit including first to fourth diodes coupled as a bridge diode format connected between the first terminal and the second terminal so as to rectify the inputted DC current from the DC power source in a predetermined direction;
an inductor unit, connected to the rectifier unit, to prevent an abrupt increase of DC current exceeding a predetermined current, such that the input DC current is gradually increased to the predetermined current from a first time point at which the input DC current is applied; and
a condenser unit that is connected in parallel to the rectifier unit, is charged with voltage in response to a current passing through the inductor unit, and discharges the charged voltage to the output unit from a second time point at which the DC current is abruptly changed, wherein the inductor unit is connected between the output unit and the condenser unit,
wherein the second time point at which the DC current is abruptly changed is a time point at which application of the DC input is interrupted,
wherein the rectifier unit flows back a residual current present in the DC-appliance power-supply circuit to the output unit when the DC current input is stopped, such that a current and voltage of the DC-appliance power-supply circuit are gradually reduced, thereby preventing an arc phenomenon generated when the current is leaked to outside of the DC-appliance power-supply circuit.

2. The power-supply circuit according to claim 1, wherein a specific time at which the DC current is abruptly changed includes the first time point at which the DC current is inputted through the input unit.

3. The power-supply circuit according to claim 1, wherein a contact point between an anode terminal of the first diode and a cathode terminal of the third diode is connected to the first terminal, and a contact point between an anode terminal of the second diode and a cathode terminal of the fourth diode is connected to the second terminal.

4. The power-supply circuit according to claim 1, wherein the DC-appliance power-supply circuit is installed in a plug or an electric device receiving the DC current.

5. The power-supply circuit according to claim 1, wherein the power-supply circuit is connected to a boosting unit and an inverter unit,
wherein the boosting unit includes a switching circuit to switch a DC voltage and output a boosted voltage through the switching circuit, and
wherein the inverter unit receives the boosted voltage so as to output AC power.

6. The power-supply circuit according to claim 2, wherein the condenser unit reduces a difference between a voltage of the first and second terminals of the input unit and another voltage of the third and fourth terminals of the output unit when the DC current input is stopped, thereby preventing an arc phenomenon.

7. The power-supply circuit according to claim 2, wherein the inductor unit prevents a current of the DC-appliance power-supply circuit from being rapidly increased when the DC current input starts operation, thereby preventing flow of a rush current.

8. The power-supply circuit according to claim 2, wherein inductance of the inductor unit is adjusted in such a manner that a current of the DC-appliance power-supply circuit is increased with an appropriate speed.

9. The power-supply circuit according to claim 3, wherein the rectifier unit further includes a fifth diode connected between a contact point of a cathode terminal of the first diode and a cathode terminal of the second diode and another contact point of an anode terminal of the third diode and an anode terminal of the fourth diode.

10. The power-supply circuit according to claim 6, wherein the condenser unit is connected between the third terminal and fourth terminals in such a manner that the charged voltage is discharged to the output unit when the DC current input is stopped.

11. The power-supply circuit according to claim 6, wherein capacitance of the condenser unit is adjusted in such a manner that the voltage difference between the input unit and the output unit is maintained within a predetermined range for a predetermined time beginning from a specific time at which the DC current input is stopped.

12. The power-supply circuit according to claim 9, wherein a cathode terminal of the fifth diode is connected to the contact point of the cathode terminals of the first and second diodes, and an anode terminal of the fifth diode is connected to the contact point of the anode terminals of the third and fourth diodes.

13. The power-supply circuit according to claim 9, wherein the rectifier unit outputs a constant-polarity DC current through the output unit irrespective of polarity of the input DC current.

14. The power-supply circuit according to claim 13, wherein, when negative power is inputted to the first terminal and positive power is inputted to the second terminal in the rectifier unit, the first and fourth diodes of the rectifier unit are turned off and the second and third diodes of the rectifier unit are turned on.

15. The power-supply circuit according to claim 13, wherein, when positive power is inputted to the first terminal and negative power is inputted to the second terminal in the rectifier unit, the first and fourth diodes of the rectifier unit are turned on and the second and third diodes of the rectifier unit are turned off.

16. A power-supply circuit for a DC appliance, comprising:
an input unit including a first terminal and a second terminal so as to receive an input DC current from a DC power source;
an output unit including a third terminal and a fourth terminal to output the input DC current entered by the input unit to a load;
a connection unit, including a first conductive line and a second conductive line so as to interconnect the input unit and the output unit;
a rectifier unit including first to fourth diodes coupled as a bridge diode format so as to rectify the input DC current from the DC power source in a predetermined direction;
a condenser unit that is connected in parallel to the rectifier unit so as to be charged with a voltage in response to the rectified current, and discharges the charged voltage to the output unit from a second time point at which the input DC current is abruptly changed; and
an inductor unit that is connected in series to the rectifier unit and the condenser unit interconnected in parallel to prevent an abrupt increase of DC current exceeding a predetermined current, in such a manner that the input DC current is gradually increased to the predetermined current from a first time point at which the input DC current is applied, wherein the inductor unit is connected between the output unit and the condenser unit,
wherein the second time point at which the DC current is abruptly changed is a time point at which application of the DC input is interrupted,
wherein the rectifier unit flows back a residual current present in the DC-appliance power-supply circuit to the output unit when the DC current input is stopped, such that a current and voltage of the DC-appliance power-supply circuit are gradually reduced, thereby preventing an arc phenomenon generated when the current is leaked to outside of the DC-appliance power-supply circuit.

17. The power-supply circuit according to claim 16, wherein an abrupt change time point of the DC current includes the first time point at which the input DC current is inputted through the input unit.

18. The power-supply circuit according to claim 16, wherein, in the rectifier unit, a contact point between a cathode terminal of the first diode and a cathode terminal of the second diode is located at the first conductive line, and a contact point between an anode terminal of the third diode and an anode terminal of the fourth diode is located at the second conductive line.

19. The power-supply circuit according to claim 16, wherein one terminal of the inductor unit is connected to the first terminal and the other terminal of the inductor unit is connected to the rectifier unit and the condenser unit interconnected in parallel.

20. The power-supply circuit according to claim 16, wherein one terminal of the inductor unit is connected to the first terminal and the other terminal of the inductor unit is connected to a contact point of an anode terminal of the first diode and a cathode terminal of the third diode.

21. The power-supply circuit according to claim 16, wherein one terminal of the inductor unit is connected to the third terminal, and the other terminal of the inductor unit is connected to the rectifier unit and the condenser unit interconnected in parallel.

22. The power-supply circuit according to claim 16, wherein the DC-appliance power-supply circuit is installed in a plug or an electric device receiving the DC current.

23. The power-supply circuit according to claim 16, wherein the power-supply circuit is connected to a boosting unit and an inverter unit,
wherein the boosting unit includes a switching circuit to switch a DC voltage and output a boosted voltage through the switching circuit, and
wherein the inverter unit receives the boosted voltage so as to output AC power.

24. The power-supply circuit according to claim 17, wherein the condenser unit reduces a difference between a voltage of the first and second terminals of the input unit and another voltage of the third and fourth terminals of the output unit when the DC current input is stopped, thereby preventing an arc phenomenon.

25. The power-supply circuit according to claim 17, wherein the inductor unit prevents a current of the DC-appliance power-supply circuit from being rapidly increased when the DC current input starts operation, thereby preventing flow of a rush current.

26. The power-supply circuit according to claim 18, wherein the rectifier unit further includes a fifth diode connected between a contact point of a cathode terminal of the first diode and a cathode terminal of the second diode and another contact point of an anode terminal of the third diode and an anode terminal of the fourth diode.

27. The power-supply circuit according to claim 20, wherein, in the rectifier unit, a contact point of an anode terminal of the second diode and a cathode terminal of the fourth diode is connected to the second terminal.

28. The power-supply circuit according to claim 24, wherein capacitance of the condenser unit is adjusted in such a manner that the voltage difference between the input unit and the output unit is maintained within a predetermined range for a predetermined time beginning from a specific time at which the DC current input is stopped.

29. The power-supply circuit according to claim 25, wherein inductance of the inductor unit is adjusted in such a manner that a current of the DC-appliance power-supply circuit is increased with an appropriate speed.

30. The power-supply circuit according to claim 26, wherein a cathode terminal of the fifth diode is connected to the contact point of the cathode terminals of the first and second diodes, and an anode terminal of the fifth diode is connected to the contact point of the anode terminals of the third and fourth diodes.

31. The power-supply circuit according to claim 26, wherein the rectifier unit outputs a constant-polarity DC current through the output unit irrespective of polarity of the input DC current.

32. The power-supply circuit according to claim 27, wherein the condenser unit is connected between the third terminal and fourth terminals in such a manner that the charged voltage is discharged to the output unit when the DC current input is stopped.

33. The power-supply circuit according to claim 31, wherein, when negative power is inputted to the first terminal and positive power is inputted to the second terminal in the rectifier unit, the first and fourth diodes of the rectifier unit are turned off and the second and third diodes of the rectifier unit are turned on.

34. The power-supply circuit according to claim 31, wherein, when positive power is inputted to the first terminal and negative power is inputted to the second terminal in the rectifier unit, the first and fourth diodes of the rectifier unit are turned on and the second and third diodes of the rectifier unit are turned off.

* * * * *